United States Patent [19]

Pospisil et al.

[11] Patent Number: 5,003,838
[45] Date of Patent: Apr. 2, 1991

[54] CABLE ROUTING END FITTING ASSEMBLY

[75] Inventor: Joseph Pospisil, Royal Oak, Mich.
Arthur L. Spease, Bloomfield Hill, both of Mich.

[73] Assignee: Teleflex Incorporated, Limerick, Pa.

[21] Appl. No.: 506,940

[22] Filed: Apr. 10, 1990

[51] Int. Cl.⁵ ............................................. F16C 1/10
[52] U.S. Cl. ................................... 74/502.4; 74/502.6
[58] Field of Search ............... 74/502.6, 502.5, 502.4, 74/500.5

[56] References Cited

U.S. PATENT DOCUMENTS

| | | | |
|---|---|---|---|
| 2,083,937 | 6/1937 | Begg | 74/502.4 |
| 3,513,719 | 5/1970 | Tschanz | 74/502.6 |
| 3,859,866 | 1/1975 | DeGrazia | 74/502.4 X |
| 4,833,937 | 5/1989 | Nagano | 74/502.6 X |
| 4,860,609 | 8/1989 | Spease | 74/502.4 |

FOREIGN PATENT DOCUMENTS

| | | | |
|---|---|---|---|
| 2938212 | 3/1978 | Fed. Rep. of Germany | 74/502.4 |
| 586248 | 3/1925 | France | 74/502.5 |
| 192615 | 11/1982 | Japan | 74/502.4 |

Primary Examiner—Rodney M. Lindsey
Attorney, Agent, or Firm—Reising, Ethington, Barnard, Perry & Milton

[57] ABSTRACT

A motion transmitting remote control assembly of the type for transmitting forces along a curved path by a flexible motion transmitting core element. The assembly (10) includes a conduit (16) with a male end fitting (20) molded at one end, which engages with a female end fitting (30). The female end fitting (30) includes a conduit (38) and attaches to a support structure (90). Splining (24, 32) is provided on the engaging portions of the male end fitting (20) and the female end fitting (30) to allow for precise rotational adjustment and locking between the male end fitting (20) and the female end fitting (30).

15 Claims, 3 Drawing Sheets

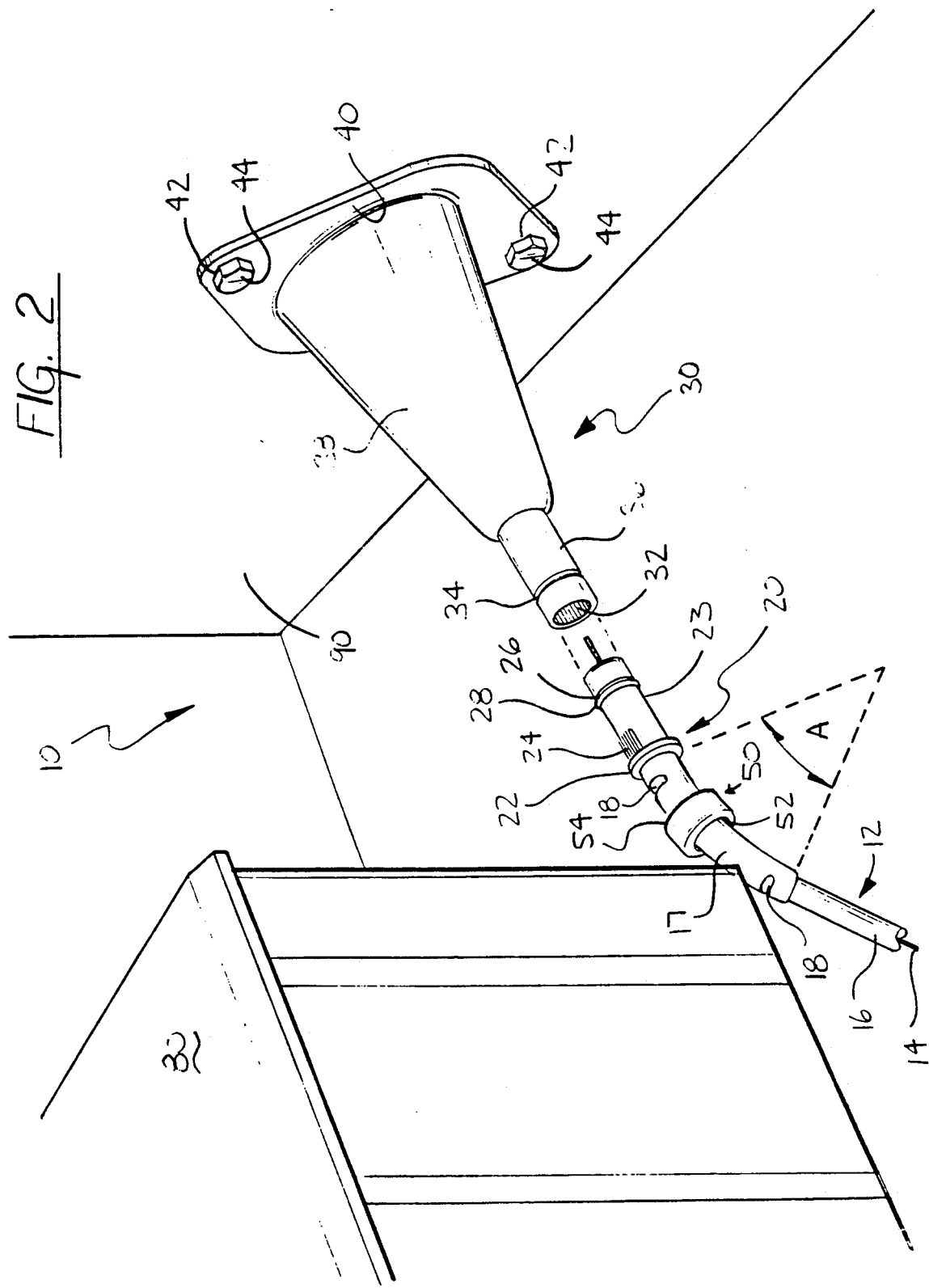

CABLE ROUTING END FITTING ASSEMBLY

TECHNICAL FIELD

The subject invention relates to motion transmitting remote control assemblies of the type for transmitting forces in a curved path by a flexible motion transmitting core element.

BACKGROUND OF THE INVENTION

Remote control assemblies utilizing flexible motion transmitting core elements are typically used in automotive, marine and aircraft environments. Such an assembly includes one or more conduits for supporting a single core element. For example, such an assembly is typically used in an automobile to control such things as the throttle (i.e., cruise control), heater, vents, and the like. In applications of this type, it is typically necessary to interconnect two conduits which support the same core element. A practice for the secure connection of such conduits is well known in the art and involves disposing a male end fitting over one end of a first conduit, and disposing a female end fitting on the corresponding end of the second conduit. The male and female end fittings engage telescopically, and are generally held in engagement by some retaining means.

It is often desirable to route one of the conduits in a curved path around some obstruction which is located in the vicinity of the end fitting assembly. Such an obstruction may be a battery, a carburetor or an engine. If the conduit is not routed around such an obstruction, the conduit may interfere with the functioning of the obstruction (e.g., if the obstruction has moving parts), or the obstruction could damage the conduit (e.g., if the obstruction becomes hot during its operation). By routing the conduit around such obstructions, problems of this type can be avoided.

As shown in FIG. 5, U.S. Pat. No. 4,860,609 to Spease discloses a cable end fitting assembly 200. The assembly 200 includes a flexible conduit 216 attached to a male end fitting 220 and a female end fitting 230 attached to a second conduit 238. The assembly 200 also includes retaining means 250 to prevent relative axial movement between the flexible conduit 216 and the second conduit 238 once the male end fitting 220 engages with the female end fitting 230. The second conduit 238 is rigid and is fixed to the support structure 290. The conduit 216 may be flexed to curve around an obstruction 280, but the assembly 200 fails to preserve the desired routing of the flexible conduit 216 because the conduit 216 may flex back to its original position or to some other curved position. Even if the curve were enforced by a rigid curved sleeve around part of the conduit 216, the routing of the conduit could change since the conduit 216 can rotate with respect to the second conduit 238. The routing can vary because the cross section of the end fitting assembly 200 is circular: the male end fitting 220 can rotate with respect to the female end fitting 230.

SUMMARY OF THE INVENTION AND ADVANTAGES

According to the present invention, there is provided a motion transmitting remote control assembly of the type for transmitting forces in a curved path by a flexible motion transmitting core element. The assembly comprises a first conduit having a first end and a second end and a second conduit having a first end and a second end. A core element is slideably supported in both of said first and said second conduits. A male end fitting is disposed about the second end of the first conduit. A female end fitting is disposed about the first end of the second conduit for telescoping engagement with the male end fitting. Retaining means is provided for retaining the male end fitting to the female end fitting when in telescoping engagement. The assembly is characterized by including locking means having a regular polygonal cross-section for providing telescoping engagement between the male and female end fitting at incremental rotational positions relative to one another, whereby the male and female end fittings may be locked together in any one of various rotational positions relative to one another.

One advantage of the present invention is that the male and female end fittings may be precisely positioned rotationally with respect to one another prior to full engagement. Precise rotational positioning of a first conduit with respect to a second conduit allows the installer to connect the two conduits without rotating them with respect to each other. If the conduits must be rotated with respect to one another in order to fit together, the routing on one or both conduits could deviate significantly from the desired routing. Full engagement between the male and female end fittings prevents relative rotational movement between the male and female end fittings. Preventing relative rotational movement between the male and female end fittings is necessary to enforce a desired routing of either the first or second conduit. This is particularly true if either of the end fittings includes a rigid curved sleeve for routing one of the conduits.

FIGURE IN THE DRAWINGS

Other advantages of the present invention will be readily appreciated as the same becomes better understood by reference to the following detailed description when considered in connection with the accompanying drawings wherein:

FIG. 2 is a perspective view of the preferred embodiment of the subject invention disposed in an engine compartment;

DETAILED DESCRIPTION OF THE PREFERRED EMBODIMENT

Figure 1:
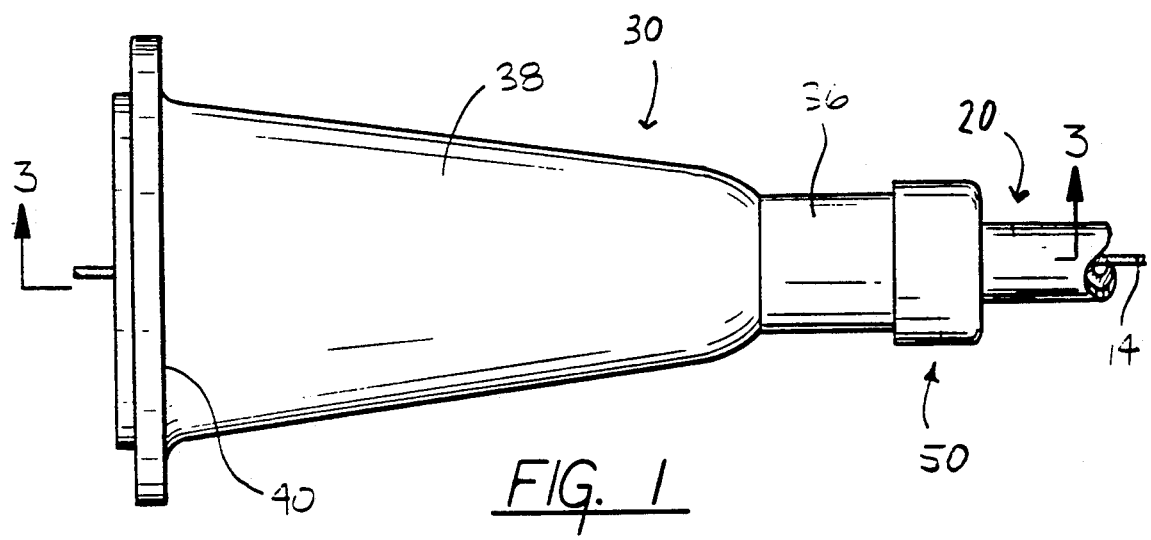
FIG. 1 is a top view of the subject invention.
Figure 5:
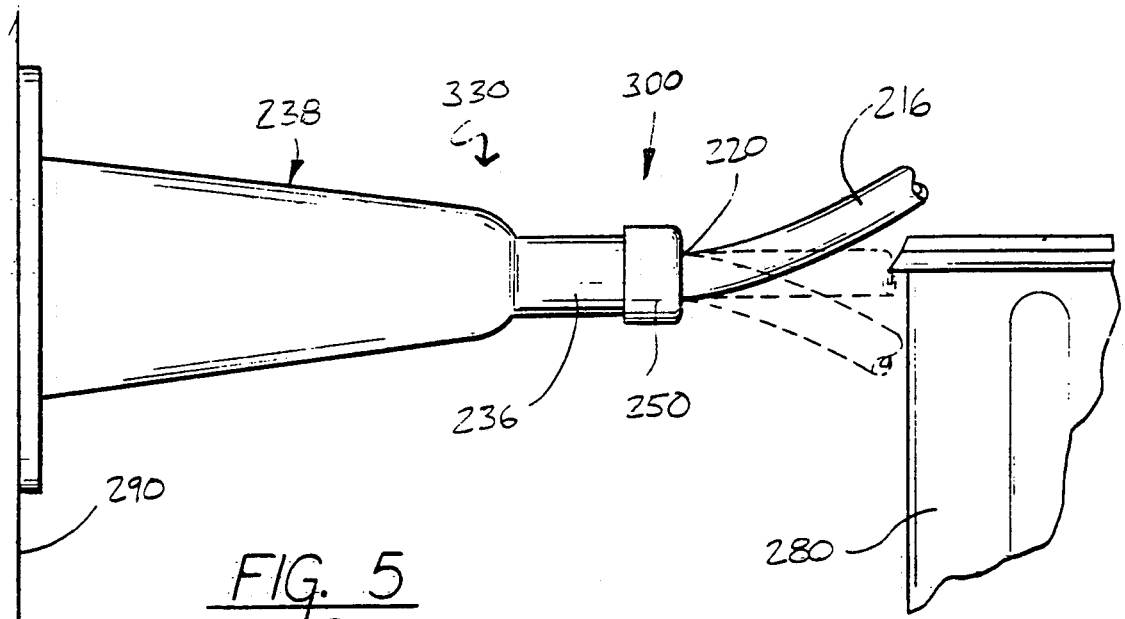
FIG. 5 is a side view of an example of prior art disposed in an engine compartment.
Figure 4:
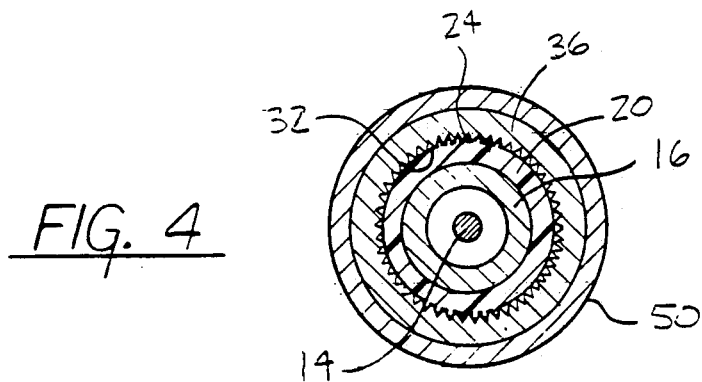
FIG. 4 is a cross sectional view taken along line 4—4 of FIG. 3.
Figure 3:
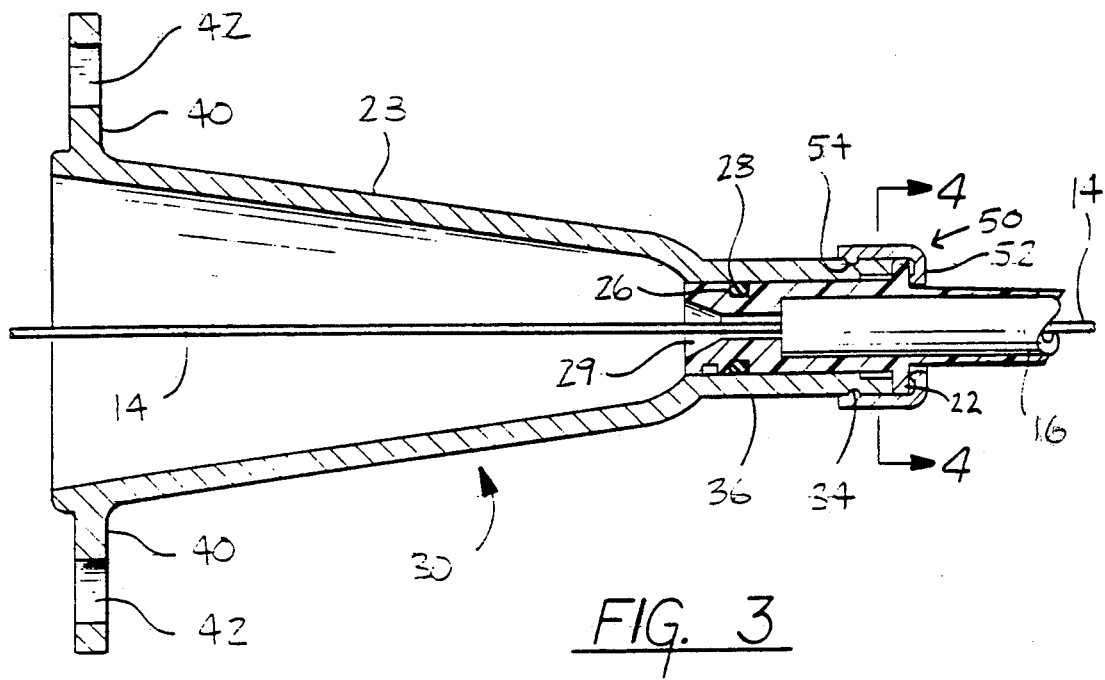
FIG. 3 is a side view taken along line 3—3 of FIG. 1.

A motion transmitting remote control assembly of the type for transmitting forces in a curved path by a flexible motion transmitting core element is generally shown at 10 in the Figures. The assembly generally includes a cable assembly 12, a male end fitting 20, a female end fitting 30 and a retaining means 50.

The cable assembly 12 includes a flexible conduit 16 which slideably supports a core element 14. The conduit 16 is preferably of the type having an inner liner or organic polymeric material. The inner liner or tube is surrounded by a plurality of long lay wires helically wrapped thereabout. An exterior casing of organic polymeric material is disposed about the long lay wires. The conduit 16 may further include a fitting (not shown) for mounting the conduit 16 to a support structure at one end.

The cable assembly 12 further includes a core element 14. The core element 14 is flexible. The core element 14 is slideably supported by the conduit 12.

The male end fitting 20 is generally a rigid piece of plastic molded about the end of the conduit 16, and having several features and characteristics. The male end fitting 20 includes a cable routing section 17 having scallops 18 and an annular flange 22 extending radially. The male end fitting 20 also includes an engaging section 23.

The cable routing section 17 of the male end fitting 20 may be curved during molding to produce any arc A as shown in FIG. 2. The degree of curve in the routing section 17 may be selected to suit the desired routing of the conduit 16 through the engine compartment. The routing section 17 of the male end fitting 20 may be formed by maintaining the conduit 16 in a curved path with a series of rods (not shown) which run perpendicular to the path of the conduit 16, parallel to each other, and where the rods pass over different surfaces of the conduit 16. A plastic sleeve is then molded over the conduit 16 forming the male end fitting. When the rods are removed from the molding, scallops 18 remain.

An annular flange 22 is molded as a part of the male end fitting 20. The flange 22 extends radially outward. The flange 22 is located on the male end fitting 20 between the routing section 17 and the straight engaging portion 23 of the male end fitting 20.

The engaging portion 23 of the male end fitting 20 includes Splining means 24, an annular groove 26 and a rubber O-ring 28 disposed in the groove 26. The engaging portion 23 further includes a hole 27 and the swivel fitting 29.

A series of splines 24 are molded on the engaging portion 23 of the male end fitting 20 just below the flange 22. The individual splines 24 run in a direction parallel to that of the conduit 16.

An annular groove 26 extending radially inward is also molded onto the engaging portion 23 of the male end fitting 20. The groove is located below the splining 24.

A rubber or plastic O-ring 28 is disposed in the annular groove 26. the O-ring has an inner diameter equal to or slightly less than the diameter of the groove 26. The O-ring has an outer diameter slightly greater than the outer diameter of the engaging portion 23 of the male end fitting 20.

The hole 27 slideably supports the core element 14 as the core element 14 passes through the hole 27.

A swivel fitting 29 is disposed at the very end of the engaging portion 23 of the male end fitting 20. The swivel fitting 29 has a frustoconical shape, with the smaller diameter of the core located away from the end of the engaging portion 23. The swivel fitting 29 allows for the swivelling movement of the core element.

The female end fitting 30 is a substantially rigid, hollow molded piece of plastic. The female end fitting 30 includes a cylindrical engaging portion 36, a conduit portion 38 and a fastening portion 40.

The engaging portion 36 includes splining 32. The splining 32 runs in a direction parallel to the core element 14 and engages with the splining 24 on the male end fitting 20. The engaging portion 36 also includes an annular groove 34 located near the end of the engaging portion 36 which engages the male end fitting 20. The conduit portion 38 has a frustoconical shape. The conduit portion 38 slideably supports the core element 14, but allows the core element 14 significant room to swivel.

The fastening portion 40 includes two holes 42 and fasteners 44 for passing through the holes 42 to fasten the female end fitting 30 to some support structure 90.

A retaining cap 50 includes an annular abutment portion 52 and an annular ring 54.

The retaining cap 50 is substantially hollow and cylindrical in shape. The inner diameter of the cap 50 roughly equals the outer diameter of the cylindrical portion 36 of the female end fitting 30. The length of the cap 50 is slightly greater than the distance between the end of the cylindrical portion 36 and the annular groove 34 on the cylindrical portion 36.

The retaining cap 50 includes an annular abutment portion 52 which extends inwardly from the outer diameter of the cap 50 to the outer diameter of the routing section 17 of the male end fitting 20.

The retaining cap 50 further includes an annular ring 54. The annular ring 54 extends radially inwardly from the inner diameter of the retaining cap 50 a distance roughly equal to the depth of the annular groove 34 located on the cylindrical portion 36 of the female end fitting 30.

Before completion of engagement of the male end fitting 20 and the female end fitting 30 the retaining cap 50 is free to slide along the conduit 16 and the routing portions 17 of the male end fitting 20.

In the installation of the cable routing end fitting 10, the female end fitting may either be completely disengaged from the male end fitting 20, or the male end fitting 20 may be engaged with the female end fitting 30 up to the point just before the splines 24 on the male end fitting 20 engage with the splines 32 on the female end fitting 30. In either case, rotational adjustment of the male end fitting 20 with respect to the female end fitting 30 is still possible. The holes 42 on the mounting flange 40 of the female end fitting 30 should be lined line with predrilled holes on the support structure 90. Fasteners 44 may then be disposed in the holes 42 to fix the female end fitting 30 to the support structure 90.

The male end fitting 20 is then adjusted rotationally so that the conduit 16 routes around an engine compartment obstruction 80 in a desired fashion. The male end fitting 20 is then fully engaged with the female end fitting 30 by inserting the end fitting 20 into the female end fitting 30 until the flange 22 contacts the end of the cylindrical portion 36.

The fine adjustment afforded by the splining assemblies 24 and 32 allows for the precise engagement between the male end fitting 20 and the female end fitting 30 so that the routing of the cable 12 is not disrupted.

The splines 24 on the male end fitting 20 and the splines 32 on the female end fitting 30 are thus fully engaged and prevent further rotational movement between the male end fitting and the female end fitting 30.

The rubber O-ring 28 seals the connection and prevents dirt and other particles or liquids from passing between the male end fitting 20 and the female end fitting 30.

The retaining cap 50 is then applied to prevent axial movement between the male end fitting 20 and the female end fitting 30. The annular ring 54 snaps into the groove 34 on the cylindrical portion 36 of the female end fitting 30. At the same time, the inner surface of the annular abutment portion 52 on the retaining cap 50 engages the flange 22 on the male end fitting 20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) of the type for transmitting forces in a curved path by a flexible motion transmitting core element (14), said assembly comprising: a first conduit (16) having a first end and a second end and a second conduit (38) having a first end and a second end, a core element (14) slideably supported in both of said first and said second conduits, a male end fitting (20) disposed about the second end of the first conduit (16), a female end fitting (30) disposed about the first end of the second conduit (38) for telescoping engagement with said male end fitting (20) to an assembled position, retaining means (50) for retaining said male end fitting (20) to said female end fitting (30) when in said assembled position, said assembly characterized by locking means (24,32) having locking teeth for providing said telescoping engagement between said male (20) and said female end fittings (30) at incremental rotational positions relative to one another while preventing any relative rotational movement between said male (20) and said female (30) end fittings, whereby said male (20) and female end fittings (30) may be telescoped together in any one of various incremental rotational positions and locked therein.

2. An assembly (10) as set forth in claim 1 further characterized by said locking means being defined by splines (24, 32) on the portions of the male (20) and female end fittings which engage telescopically.

3. An assembly (10) as set forth in claim 2 wherein said splines (32) are disposed around the inner circumference of the female end fitting (30).

4. An assembly (10) as set forth in claim 3 wherein said splines (24) are disposed around at least part of the outer circumference of the male end fitting (20).

5. An assembly (10) as set forth in claim 4 further characterized by one of said male and female end fittings having a rigid curved sleeve (17) extending outside of the other end fitting during telescopic engagement to enforce a predetermined routing of a said one of said first (16) and second conduits (38).

6. An assembly (10) as set forth in claim 5 further characterized by said rigid curved sleeve (17) including at least three scallops (18) having "U-shaped" cross-section.

7. An assembly (10) as set forth in claim 5 further characterized by said male end fitting (20) including an annular flange (22) located adjacent said splines for (24) engaging the female end fitting (30) during telescopic engagement.

8. An assembly (10) as set forth in claim 7 further characterized by said retaining means (50) simultaneously engaging said flange (22) of said male end fitting (20) and said female end fitting (30).

9. An assembly (10) as set forth in claim 8 further characterized by said retaining means (50) including a radially extending annular abutment portion (52) for engaging said flange (22) to prevent relative axial movement between said male end fitting (20) and said female end fitting (30).

10. An assembly (10) as set forth in claim 9 further characterized by said female end fitting (30) including a radially extending groove (34), said retaining means (50) including a radially extending annular ring (54) with said annular ring (50) disposed in said groove (34).

11. An assembly (10) as set forth in claim 10 further characterized by said assembly (10) including sealing means (26, 28) between said male end fitting (20) and said female end fitting (30) for preventing fluid from passing therebetween.

12. An assembly as set forth in claim 11 further characterized by said male end fitting (20) including a radially extending annular channel (26), and said sealing means (26, 28) comprising an O-ring seal (28) disposed in said radially extending annular channel (26).

13. An assembly (10) as set forth in claim 12 further characterized by said female end fitting (30) including a fastening portion (40) for mounting said female end fitting (30) to a support structure (90).

14. An assembly as set forth in claim 13 further characterized by said female end fitting (30) comprising a cylindrical portion (36) for engaging said male end fitting (20) and a conduit portion (38) extending longitudinally away from said male end fitting (20).

15. An assembly (10) as set forth in claim 14 further characterized by said male end fitting (20) having an opening hole (27) therethrough for slideably supporting said core element (14), said opening hole (27) having an enlarged portion (29) for permitting swivelling movement of said core element.

* * * * *